Sept. 21, 1954 J. F. ZALESKI 2,689,942

IMPEDANCE-MATCHED TEE JUNCTION

Filed Oct. 19, 1951

INVENTOR.
JOHN F. ZALESKI
BY H. L. Mackey
ATTORNEY.

Patented Sept. 21, 1954 2,689,942

UNITED STATES PATENT OFFICE 2,689,942

IMPEDANCE-MATCHED T JUNCTION

John F. Zaleski, Valhalla, N. Y., assignor to General Precision Laboratory Incorporated, a corporation of New York Application October 19, 1951, Serial No. 252,036

5 Claims. (Cl. 333—11)

This invention pertains to microwave rectangular guide hybrid junctions and particularly to arrangements for impedance matching tee junctions of the series tee and magic tee type over a wide band of frequencies.

Tee junctions such as the series tee and the magic tee, which constitute a specific form of wave guide hybrid junction consisting of a shunt tee and series tee in combination, are well known and widely used. However, if the inherent impedance phase shifts and mismatches of these junctions are not carefully compensated for, serious reflections are caused at the input arm, resulting in undesirably high standing waves therein, which are indicated by a high voltage standing wave ratio (VSWR). It is therefore common practice to apply matching means, which, in the magic tee junction, for example, conventionally consist of an iris and a post. When this is done with sufficient care, the output in the fourth arm is, at a selected frequency, equal to zero, and the VSWR in the input arm is reduced to a low value.

Such a magic tee is, however, a relatively narrow band device, which constitutes a serious defect thereof, since the magic tee matching iris and post must be cut and positioned for a particular midband frequency and soldered in place. Once so constructed for a selected frequency band such a magic tee cannot be readjusted and thus cannot be employed for use with signal frequencies lying outside of that band without giving rise to undesirably high reflections. Such narrow frequency band devices are consequently restricted in their field of use and indeed such devices may in some circuits cause malfunctioning, particularly when a magnetron is used as a source of energy, since it is difficult to hold a magnetron at constant frequency if the load impedance varies from predetermined limits.

This invention provides a magic tee containing novel matching components arranged in specified locations and attitudes. The employment of these matching components facilitates both the design and fabrication of the magic tee, results in a device which is highly efficient at the design frequency and a device whose positional and dimensional tolerances are relatively noncritical. Even more important, however, the device of the instant invention has approximately twice the bandwidth of the conventional type as determined by using the shunt (H) or series (E) arms as input terminals. Thus the device of the instant invention can be utilized in many arrangements where prior devices of this nature cannot be so used because of their relatively narrow band characteristics.

In general, a first matching component provided in the instant invention principally matches out the junction discontinuity or phase shift and the impedance mismatch as presented by the junction to the series arm. A second matching component is so placed as to match similar irregularities with regard to the shunt arm. Each of these matching components thus has functions specifically pertaining to only three of the four arms. Therefore, the three arms designated as the collinear arms and the series arm, together with the first matching component, can be considered as a separate functional group and, indeed, when constructed separately this group functions as a novel form of highly efficient series tee junction.

The principal object of this invention is to provide an efficient and broadband magic tee microwave junction.

Another object is to provide a magic tee including easily designed matching components having relatively noncritical dimensional and positional tolerances.

Still another object is to provide a broadband efficient series tee.

A further understanding of this invention may be secured from the detailed description and the drawings, in which.

Figure 1:
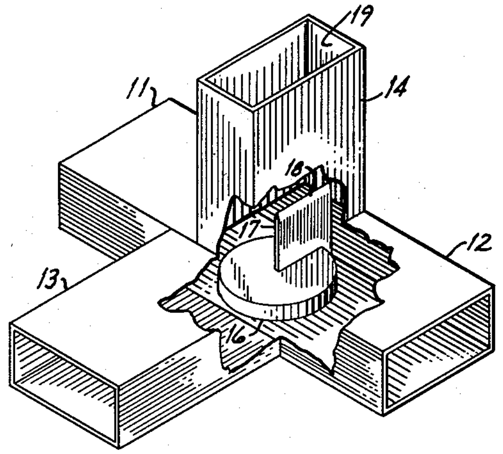
Fig. 1 illustrates a magic tee employing the matching elements of the invention.

Referring now to Fig. 1, a magic tee is illustrated having two rectangular wave guide collinear arms 11 and 12. A third arm 13 is joined to the collinear arms in an H-plane junction, and this arm, because it acts in a manner analogous to that of a low-frequency shunt circuit, is termed a shunt arm. A fourth or series arm 14 is joined to the collinear arms 11 and 12 to form an E-plane junction with them. The four wave guide axes all meet at a single point, the three axes of the arms 11, 12 and 13 being in one plane and the axis of the arm 14 being perpendicular to that plane. The cross-sectional dimensions of the wave guide have a ratio of about 2 to 1, which has been found generally suitable for transmitting microwave energy in the $TE_{1,0}$ or dominant mode. Such wave guide is intrinsically wideband.

When microwave energy of frequency suitable for the size of wave guide used is applied to the series arm 14, the energy is divided into two equal parts which pass out the collinear arms 11 and 12 in opposite phase and without reflection at the output ends of the arms if the collinear arms are terminated in the wave guide characteristic impedance. No energy passes out the arm 13. However, in the absence of any matching elements at the junction considerable energy is also reflected back into the input arm 14, in part due to the mismatch of a load having an impedance $2Z_0$ terminating the input wave guide 14 having an impedance $Z_0$, and in part due to the mismatch or phase change caused by the junction effect. This reflected energy results in a VSWR in the input arm of 2 or more. When the shunt arm 13 is made the input the output is again divided between the collinear arms 11 and 12, with no output through the arm 14, and again the energy is partly reflected back into the input arm 13, resulting in a high VSWR. In practice such high reflections cannot be tolerated, and some form of impedance matching is employed.

The conventional elements employed for matching such a tee consist of an inductive iris placed in the series arm and a thin post so placed as to be parallel to the axis of the series arm. It is always possible, when enough care is taken when using such elements, to match a magic tee so that at a single frequency it is substantially equally well matched looking into each of the arms. However, a magic tee so matched is fairly frequency sensitive so that the losses due to reflection rise rapidly as the applied signal frequency departs from the selected frequency. The two matching components also are not independent of each other in their effect. Furthermore, the matching by each component of phase mismatch and impedance magnitude mismatch are interdependently due to its several dimensions and its placement.

In the embodiment of the invention illustrated in Fig. 1, matching is effected by the use of a disc 16 and a septum 17. The disc constitutes a short right circular cylinder of metal and has one of its flat sides secured to the unbroken broad interior surface of the structure composed of the shunt arm and collinear arms. The disc 16 is positioned so that its extended axis passes through the intersection of the axes of the shunt and collinear arms and is therefore in exact line with the axis of the series arm 14. Such a disc when so placed and of appropriate diameter and thickness is found to compensate the impedance mismatch and discontinuity as seen by the series arm 14, and to accomplish this compensation with a high degree of accuracy. The sum of the diameter of the disc plus twice its thickness is made approximately equal to one-half of the wavelength of the signal energy in the wave guide for the desired midband frequency. However, the dimensioning of this disc is not critical within certain limits and numerous combinations of thickness and diameter are satisfactory. As a specific example, when employed in a magic tee composed of 1″ x ½″ x .050″ wave guide, for a midband frequency of 9000 mc. p. s., a diameter of .750 inch and a thickness of .095 inch are found to be satisfactory.

The only limitations on disc diameter are that it should not be greater than the largest of the wave guide cross sectional dimensions and that the diameter of the disc should exceed its thickness.

A great variety of shapes other than the one described can be employed for this disc with nearly equal or slightly better efficiency. However, the circular form is highly efficient and one of the easiest forms to design and to fabricate. For that reason such form is preferred.

The septum 17 is composed of thin sheet metal, a thickness of 1/64″ having been found satisfactory. When such thin metal is used and in addition when the upper edge 18 thereof is sharpened to a thin edge, the septum has no measurable effect on the functioning of the series arm 14. The septum is secured to the narrow wall 19 of the series arm 14 and is also secured at its bottom edge to the lower broad interior surface of the collinear arms 11 and 12 at their junction and to the edge and top surfaces of the button 16. These anchorages are most easily constructed by cutting a slot in the parts, inserting the septum and soldering it in place. The length of the septum from its sharpened edge 18 to the horizontal center plane of the collinear arms is preferably approximately $$\frac{\lambda g}{4}$$

in which $\lambda g$ is the wavelength of the energy in the wave guide corresponding to midband frequency. For example, when the midband frequency is 9000 mc. p. s., $\lambda g=1.914''$ in 1″ x ½″ x .050″ guide, a satisfactory total length for the septum was found to be .720″. The septum width is also approximately $$\frac{\lambda g}{4}$$

a satisfactory width having been found to be .525″.

The septum matches impedance of the shunt arm in a manner different from that of the conventional post. Since the conventional matching post does not include the point at which the guide axes intersect, violent, although local standing waves, are set up in the vicinity of the post. Where a septum is used, its plane includes the axial intersection point and the field discontinuity is therefore compensated at its source without producing surrounding electric field disturbance. In addition, because the septum can be made much thinner than a post, voltage breakdown in the series arm is maintained at a high value.

The septum matches both the phase discontinuity and the impedance discontinuity of the junction, in general the former by septum length and the latter by septum width. These two independent and easily adjusted dimensions thus provide a means for independent matching of the above two types of junction discontinuity.

Figure 2:
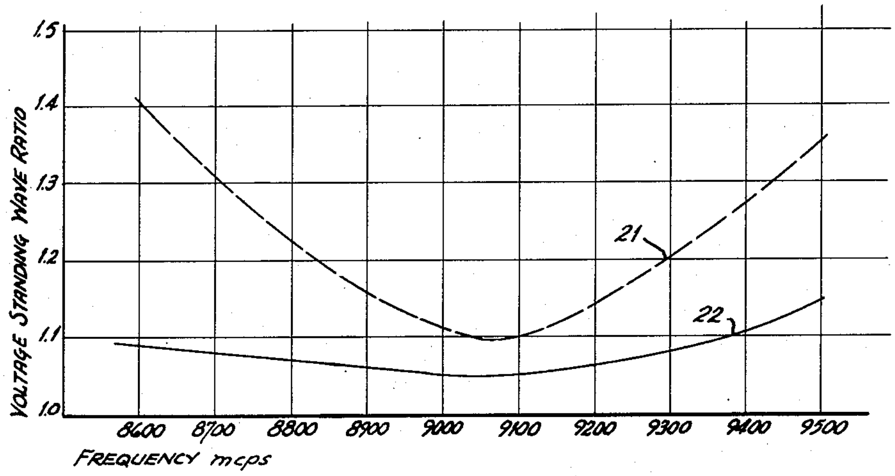
Fig. 2 is a graph illustrating operating characteristics of the magic tee of Fig. 1 in relation to the characteristics of prior devices.

Tests have shown that a magic tee so constructed has for a given bandwidth, approximately half of the maximum power loss of the conventionally-matched magic tee. This comparison is graphically depicted in Fig. 2 by the dashed voltage standing wave ratio curve 21 for E-arm input to a representative magic tee of conventional design and a similar curve 22 for the magic tee described in connection with Fig. 1. Power applied to any one of the terminals illustrated in Fig. 1 will be divided and transmitted to the adjacent terminals with an efficiency over a broad band of frequencies comparable to that indicated by the VSWR curve 22.

If power be applied to the series arm 14, Fig. 1, it is divided equally between arms 11 and 12 acting as output arms and no power is transmitted to the arm 13. The termination of this arm 13 has substantially no effect on the functioning of the magic tee in this manner and in fact the arm 13 may be entirely removed without greatly affecting the described action.

Figure 3:
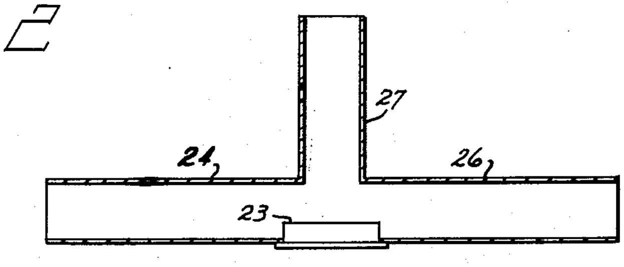
Fig. 3 is a sectional view of a series tee employing a matching element of the invention.

Thus it follows that a series tee may be constructed employing the described principles, omitting the septum 17 which has no effect on the series arm. The resulting series tee is illustrated in Fig. 3. The disc 23 is secured to the continuous broad side of the collinear arms 24 and 26, with its axis positioned in the prolongation of the axis of the series arm 27. As before described, the sum of the diameter plus twice the thickness is approximately equal to one-half wavelength in the wave guide, however, because of the effect of removal of the shunt arm it is desirable to make the disc slightly thicker than that employed in the magic tee. For example, it has been found that a satisfactory disc for use in 1" x ½" x .050" wave guide has a diameter of .750" and a thickness of .125".

Such a series tee has been found by test to be exceedingly broadband by the usual standards for such components. For example, for a midband frequency of 9000 mc. p. s. one design has a midband VSWR of 1.01 with a maximum VSWR of not over 1.11 throughout a 1000 mc. band. These test results indicate that this tee has very nearly the low attenuation and wide band characteristics of a simple piece of straight wave guide of comparable length.

What is claimed is:

1. A four-arm microwave hollow rectangular guide junction of the magic tee type comprising, a pair of collinear arms of hollow rectangular guide, a shunt arm of hollow rectangular guide joining said collinear arms pair at their intersection in an H-plane junction, a series arm of hollow rectangular guide joining said collinear arms pair at their intersection in an E-plane junction, a flat conductive member of greater breadth than thickness having one flat face secured to an interior wide surface of said pair of collinear arms, said flat conductive member being symmetrical about an axis normal to the flat face thereof, the axis of symmetry of said flat conductive member coinciding with the longitudinal axis of said series arm, and constituting a matching means for said series arm and a conductive septum electrically connected at two edges orthogonally to one wide interior surface and one narrow interior surface of said pair of collinear arms and along the top face of said flat conductive member, said flat septum comprehending a prolongation of the axis of said series arm and constituting matching means for said shunt arm.

2. A four-arm microwave hollow rectangular guide junction in accordance with claim 1 in which the longitudinal axes of all four arms meet in a point lying in said septum and lying in the prolonged axis of said conductive member.

3. A four-arm microwave hollow rectangular guide junction in accordance with claim 1 in which said conductive member is in the form of a short right circular cylinder and said septum has the form of a flat thin rectangular sheet.

4. A four-arm microwave hollow rectangular guide junction in accordance with claim 1 in which said flat member is a disc whose diameter plus twice its axial length is substantially equal to one-half of the microwave length of the energy in the wave guide and in which the length of said septum is approximately one-third of the microwave length of the energy in the wave guide and said septum width is approximately one-quarter of the microwave length of the energy in the wave guide.

5. A matched rectangular hollow wave guide tee comprising, a pair of collinear arms composed of hollow rectangular wave guide sections, a series arm consisting of a hollow rectangular wave guide section joined to said pair of collinear arms at their intersection in an E-plane junction, a conductive disc member of greater diameter than thickness and whose diameter plus twice its thickness is substantially equal to one-half of the microwave length of the energy in the wave guide projecting inwardly from a wide interior surface of said pair of collinear arms, the diametrical dimension of said disc member lying in a plane parallel to the interior wide surface of said collinear arms and positioned to have its rotational axis coinciding with an extension of the longitudinal axis of said series arm.

References Cited in the file of this patent

UNITED STATES PATENTS

| Number | Name | Date |
|---|---|---|
| 2,584,162 | Sensiper | Feb. 5, 1952 |
| 2,593,120 | Dicke | Apr. 15, 1952 |

OTHER REFERENCES

"Microwave Transmission Circuits," M. I. T. Radiation Laboratory Series, vol. 9, edited by Ragan, 1949, pp. 375 and 376. (Copy in Div. 69.)

"Microwave Transmission Circuits," M. I. T. Radiation Laboratory Series, vol. 10, edited by Marcuvitz, p. 112. (Copy in Div. 69.)